United States Patent
Welchko

(10) Patent No.: US 8,115,433 B2
(45) Date of Patent: Feb. 14, 2012

(54) ELECTRICAL SYSTEM FOR PULSE-WIDTH MODULATED CONTROL OF A POWER INVERTER USING PHASE-SHIFTED CARRIER SIGNALS AND RELATED OPERATING METHODS

(75) Inventor: Brian A. Welchko, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 490 days.

(21) Appl. No.: 12/236,172

(22) Filed: Sep. 23, 2008

(65) Prior Publication Data
US 2010/0072928 A1 Mar. 25, 2010

(51) Int. Cl.
H02P 27/06 (2006.01)

(52) U.S. Cl. ......... 318/400.13; 318/400.11; 318/400.12; 318/807; 318/432

(58) Field of Classification Search ............. 318/400.13, 318/400.11, 400.12, 807, 432
See application file for complete search history.

(56) References Cited

U.S. PATENT DOCUMENTS

| | | | | |
|---|---|---|---|---|
| 5,142,468 | A * | 8/1992 | Nerem | 363/71 |
| 5,852,558 | A * | 12/1998 | Julian et al. | 363/132 |
| 6,242,884 | B1 | 6/2001 | Lipo et al. | |
| 6,465,973 | B1 | 10/2002 | Kato et al. | |
| 6,617,820 | B2 | 9/2003 | Carlson et al. | |
| 6,956,341 | B2 * | 10/2005 | Nakai et al. | 318/400.01 |
| 7,057,361 | B2 * | 6/2006 | Kitahata et al. | 318/139 |
| 7,084,600 | B2 * | 8/2006 | Suzuki et al. | 318/802 |
| 7,154,237 | B2 | 12/2006 | Welchko et al. | |
| 7,215,116 | B2 * | 5/2007 | Nishimura | |
| 7,224,079 | B2 * | 5/2007 | Kanazawa et al. | 290/40 B |
| 7,307,401 | B2 | 12/2007 | Gataric et al. | |
| 7,391,181 | B2 | 6/2008 | Welchko et al. | |
| 7,411,801 | B2 | 8/2008 | Welchko et al. | |

(Continued)

FOREIGN PATENT DOCUMENTS

CN 1829073 A 9/2006

OTHER PUBLICATIONS

Welchko, B. A., Schulz, S. E., and Hiti, S., U.S. Appl. No. 11/736,687, entitled "Method and system for pulse position scheduling in electric drives," and filed Apr. 18, 2007.

(Continued)

Primary Examiner — Walter Benson
Assistant Examiner — David S Luo
(74) Attorney, Agent, or Firm — Ingrassia Fisher & Lorenz, P.C.

(57) ABSTRACT

Systems and methods are provided for pulse-width modulated control of power inverter using phase-shifted carrier signals. An electrical system comprises an energy source and a motor. The motor has a first set of windings and a second set of windings, which are electrically isolated from each other. An inverter module is coupled between the energy source and the motor and comprises a first set of phase legs coupled to the first set of windings and a second set of phase legs coupled to the second set of windings. A controller is coupled to the inverter module and is configured to achieve a desired power flow between the energy source and the motor by modulating the first set of phase legs using a first carrier signal and modulating the second set of phase legs using a second carrier signal. The second carrier signal is phase-shifted relative to the first carrier signal.

20 Claims, 3 Drawing Sheets

U.S. PATENT DOCUMENTS

| | | | |
|---|---|---|---|
| 7,471,004 B2 * | 12/2008 | Kanazawa et al. | 290/40 B |
| 7,619,344 B2 | 11/2009 | Osawa et al. | |
| 7,808,125 B1 * | 10/2010 | Sachdeva et al. | 307/82 |
| 7,830,060 B2 | 11/2010 | Miyata et al. | |
| 7,915,778 B2 | 3/2011 | Miyata et al. | |
| 7,952,316 B2 | 5/2011 | Ganev et al. | |
| 2002/0108387 A1 | 8/2002 | Barrett et al. | |
| 2003/0048089 A1 | 3/2003 | Carlson et al. | |
| 2005/0017672 A1 | 1/2005 | Suzuki et al. | |
| 2005/0174076 A1 | 8/2005 | Katanaya | |
| 2006/0119352 A1 | 6/2006 | Nishimura | |
| 2006/0164027 A1 | 7/2006 | Welchko et al. | |
| 2006/0220489 A1 | 10/2006 | Osawa et al. | |
| 2008/0094023 A1 | 4/2008 | West et al. | |
| 2008/0116840 A1 | 5/2008 | Welchko et al. | |
| 2008/0197902 A1 | 8/2008 | Welchko et al. | |
| 2009/0230806 A1 | 9/2009 | Miyata et al. | |

OTHER PUBLICATIONS

Hiti, S., Schulz, S. E., and Welchko, B. A., U.S. Appl. No. 11/756,421, entitled "Apparatus, systems, and methods for reducing voltage source inverter losses," and filed May 31, 2007.

Welchko, B. A., Schulz, S. E., and Hiti, S., U.S. Appl. No. 11/853,884, entitled "Method and system for controlling power inverters in electric drives of vehicles with two-mode transmissions," and filed Sep. 12, 2007.

Schulz, S. E., West, S. T., Welchko, B. A., and Hiti, S., U.S. Appl. No. 11/923,270, entitled "Method and system for controlling a power inverter in electric drives," and filed Oct. 24, 2007.

Schulz, S. E., West, S. T., Welchko, B. A., and Hiti, S., U.S. Appl. No. 11/923,287, entitled "Method and system for controlling a power inverter in electric drives of vehicles with two-mode transmissions," and filed Oct. 24, 2007.

Schulz, S. E., Welchko, B. A., and Hiti, S., U.S. Appl. No. 11/923,293, entitled "Method and system for controlling pulse width modulation in a power inverter in electric drives," and filed Oct. 24, 2007.

Welchko, B. A., Schulz, S. E., and Hiti, S., U.S. Appl. No. 12/013,093, entitled "Method and system for controlling a power inverter in electric drives," and filed Jan. 11, 2008.

Office Action dated Jun. 27, 2011 for Chinese Patent Application No. 200910178011.8.

U.S. Office Action, dated Sep. 14, 2011, for U.S. Appl. No. 12/473,933.

* cited by examiner

ELECTRICAL SYSTEM FOR PULSE-WIDTH MODULATED CONTROL OF A POWER INVERTER USING PHASE-SHIFTED CARRIER SIGNALS AND RELATED OPERATING METHODS

STATEMENT REGARDING FEDERALLY SPONSORED RESEARCH OR DEVELOPMENT

The United States government has a paid-up license in this invention and the right in limited circumstances to require the patent owner to license others on reasonable terms as provided by the terms of contract number DE-FC26-07NT43123 awarded by the United States Department of Energy.

TECHNICAL FIELD

Embodiments of the subject matter described herein relate generally to vehicle drive systems, and more particularly, embodiments of the subject matter relate to electric and/or hybrid vehicles having an inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Often, a capacitor is configured electrically in parallel between a DC energy source and the power inverter in order to reduce voltage ripple. This capacitor, often referred to as the DC link capacitor or bulk capacitor, must have a large enough capacitance and power rating to handle a peak RMS ripple current during operation. This generally results in use of a larger capacitor than necessary because it is difficult to find a capacitor with the proper capacitance and current rating. Typically, the capacitor ranges from approximately 500 microfarads with a volume of approximately 0.9 liters to 1000 microfarads with a volume of approximately 4.0 liters. As a result, when packaged together with an inverter, the capacitor typically occupies 30 to 40 percent of the total volume of the power inverter module. This, in turn, limits the ability to reduce the size, weight, and cost of the power inverter module.

BRIEF SUMMARY

An apparatus is provided for an electrical system for use in a vehicle. The electrical system comprises an energy source and a motor. The motor has a first set of windings and a second set of windings, which are electrically isolated from each other. An inverter module is coupled between the energy source and the motor. The inverter module comprises a first set of phase legs coupled to the first set of windings and a second set of phase legs coupled to the second set of windings. A controller is coupled to the inverter module and is configured to achieve a desired power flow between the energy source and the motor by modulating the first set of phase legs using a first carrier signal and modulating the second set of phase legs using a second carrier signal. The second carrier signal is phase-shifted relative to the first carrier signal.

In another embodiment, an apparatus is provided for an automotive drive system. The automotive drive system comprises an energy source and an electric motor. The electric motor comprises a first winding and a second winding. The first winding and the second winding are electrically isolated and each corresponds to a first phase of the electric motor. An inverter module is coupled to the energy source and comprises a first phase leg coupled to the first winding and a second phase leg coupled to the second winding. A controller is coupled to the inverter module and configured to modulate the first phase leg using a first carrier and modulate the second phase leg using a second carrier. The second carrier is phase-shifted relative to the first carrier.

A method is provided for operating an inverter module configured to drive an electric motor. The electric motor has a first set of windings coupled to a first set of phase legs of the inverter module and a second set of windings coupled to a second set of phase legs of the inverter module. The method comprises modulating a first set of phase legs using a first carrier signal and modulating the second set of phase legs using a second carrier signal. The second carrier signal has a phase shift relative to the first carrier signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. Furthermore, the terms "first", "second" and other such numerical terms referring to structures do not imply a sequence or order unless clearly indicated by the context.

For the sake of brevity, conventional techniques related to signaling, current sensing, motor control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to systems and methods for operating an electric motor using a power inverter module. In an exemplary embodiment, the electric motor is realized as a three-phase motor having two sets of windings, wherein each set of windings is a three-phase set of windings. The first set of windings is controlled by a first set of phase legs in the inverter module, and the second set of windings is controlled by a second set of phase legs in the inverter module. The first set of phase legs is controlled by generating pulse-width modulation (PWM) signals with respect to a first carrier signal and the second set of phase legs is controlled by generating PWM signals with respect to a second carrier signal. The resulting DC link capacitor ripple current is reduced, thereby allowing for the use of a smaller DC link capacitor when coupling the inverter module to an energy source.

Figure 1:
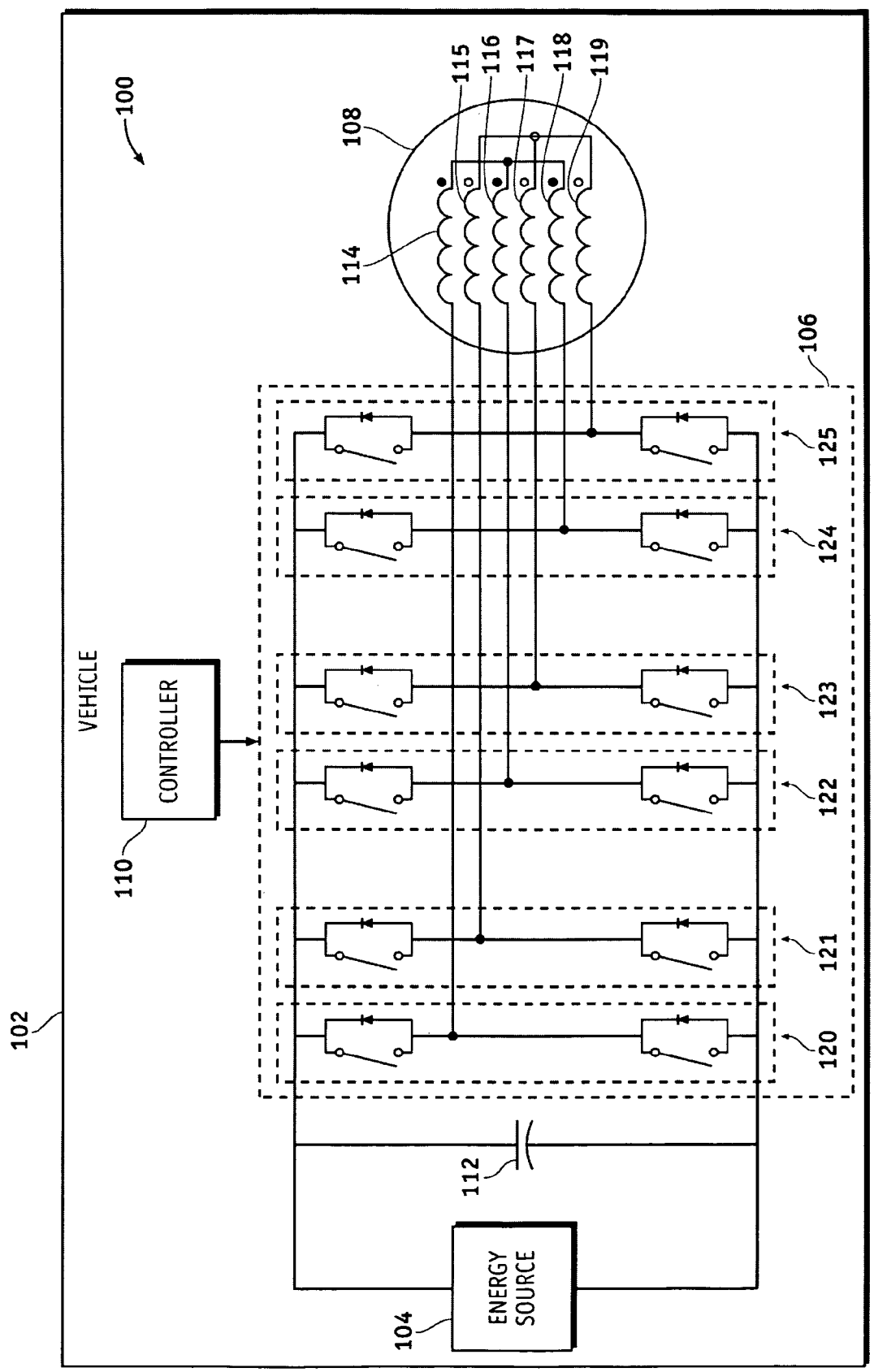
FIG. 1 is a block diagram of an exemplary electrical system suitable for use in a vehicle in accordance with one embodiment.

FIG. 1 depicts an exemplary embodiment of an electrical system 100 suitable for use as an automotive drive system for a vehicle 102. In an exemplary embodiment, the electrical system 100 includes, without limitation, an energy source 104, a power inverter module 106, a motor 108, and a controller 110. A capacitor 112 may be coupled between the energy source 104 and the inverter module 106 such that the capacitor 112 and energy source 104 are electrically parallel. In this regard, the capacitor 112 may alternatively be referred to as the DC link capacitor or bulk capacitor. In an exemplary embodiment, the controller 110 operates the inverter module 106 to achieve a desired power flow between the energy source 104 and the motor 108 and reduce ripple current, as described below.

The vehicle 102 is preferably realized as an automobile, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 102 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor. In this regard, the energy source 104 may comprise a battery, a fuel cell (or fuel cell stack), an ultracapacitor, a controlled generator output, or another suitable voltage source. The battery may be any type of battery suitable for use in a desired application, such as a lead acid battery, a lithium-ion battery, a nickel-metal battery, or another rechargeable battery.

In an exemplary embodiment, the motor 108 is a multiphase alternating current (AC) motor and includes a set of windings (or coils), wherein each winding corresponds to a phase of the motor 108, as described in greater detail below. Although not illustrated, the motor 108 includes a stator assembly (including the coils), a rotor assembly (including a ferromagnetic core), and a cooling fluid (i.e., coolant), as will be appreciated by one skilled in the art. The motor 108 may be an induction motor, a permanent magnet motor, or any type suitable for the desired application. Although not illustrated, the motor 108 may also include a transmission integrated therein such that the motor 108 and the transmission are mechanically coupled to at least some of the wheels of the vehicle 102 through one or more drive shafts.

In the exemplary embodiment shown in FIG. 1, the motor 108 is realized as a three-phase AC motor having a first three-phase set of windings (including windings 114, 116, and 118) and a second three-phase set of windings (including winding 115, 117, and 119). In this regard, the motor 108 may be understood as having a dual three-phase winding configuration. It should be understood that although the electrical system 100 is described herein in the context of a three-phase motor, the subject matter described herein is independent of the number of phases of the motor.

In an exemplary embodiment, the first three-phase set of windings and the second three-phase set of windings are electrically isolated from each other and have the same or identical winding structure. That is, a first (e.g., phase A) winding 114 of the first set of windings has the same winding factor as a second (e.g., phase A) winding 115 of the second set of windings. Additionally, the two phase A windings 114, 115 are electrically isolated and occupy (or share) the same slots in the stator of the motor 108. In a similar manner, the two phase B windings 116, 117 have the same winding factor and occupy the same slots in the stator, and the two phase C windings 118, 119 have the same winding factor and occupy the same slots in the stator. It should be understood that the labeling of phases A, B, and C is for ease of description and is not intended to limit the subject matter in any way.

In an exemplary embodiment, the two sets of windings are each configured as a wye-connection. For example, one end of each winding of the first set of windings is connected to ends of the other windings of the first set at a common node. That is, the same ends of winding 114, winding 116, and winding 118 are connected and/or terminate at a common node. In an exemplary embodiment, where the first set of windings and the second set of windings have the same winding structure, the ends of winding 115, winding 117, and winding 119 are connected and/or terminate at a second common node at the same end as the first set of windings.

In the exemplary embodiment shown in FIG. 1, the power inverter module 106 includes twelve switches (e.g., semiconductor devices, such as transistors and/or switches) with antiparallel diodes (i.e., diodes which are antiparallel to each switch). Preferably, the switches are realized using insulated-gate bipolar transistors (IGBTs). As shown, the switches in the inverter module 106 are arranged into six legs (or pairs), with legs 120, 122, 124 each being coupled to a respective end (i.e., the end of the windings not connected to form the wye-connection) of the windings 114, 116, 118, and legs 121, 123, 125 each being coupled to a respective end of the windings 115, 117, 119. In this regard, leg 120 is coupled to the first phase A winding 114, leg 122 is coupled to the first phase B winding 116, and leg 124 is coupled to the first phase C winding 118. Similarly, leg 121 is coupled to the second phase A winding 115, leg 123 is coupled to the second phase B winding 117, and leg 125 is coupled to the second phase C winding 119. Thus, legs 120 and 121 may be collectively referred to as the phase A legs, legs 122 and 123 the phase B legs, and legs 124, 125 the phase C legs.

In an exemplary embodiment, the controller 110 is in operable communication and/or electrically coupled to the inverter module 106. The controller 110 is responsive to commands received from the driver of the vehicle 102 (e.g., via an accelerator pedal) and provides a command to the inverter module 106 to control the output of the inverter phase legs 120, 121, 122, 123, 124, 125. In an exemplary embodiment, the controller 110 is configured to modulate and control the inverter module 106 using high frequency pulse width modulation (PWM), as described below. The controller 110 provides PWM signals to operate the switches within the inverter phase legs 120, 121, 122, 123, 124, 125 to cause output voltages to be applied across the windings 114, 115, 116, 117, 118, 119 within the motor 108 in order to operate the motor 108 with a commanded torque. Although not illustrated, the controller 110 may generate current and/or voltage commands for the phases of the motor 108 in response to receiving a torque command from an electronic control unit (ECU) or another control module within the vehicle 102. Further, in some embodiments, the controller 110 may be integral with an ECU or another vehicle control module.

In an exemplary embodiment, the controller 110 determines a current and/or voltage command, hereinafter referred to as the "command signal," for the individual phases of the motor 108 based on based on the torque command, the voltage of energy source 104, the angular velocity of the motor 108, and possibly other operating parameters of the electric system 100. The controller 110 then generates PWM signals for the switches in the inverter module 106 by comparing the command signal to a carrier signal in a known manner. For example, the controller 110 may generate PWM signals for the inverter phase legs 120, 121, 122, 123, 124, 125 by using an intersective method. In this manner, the command signal is compared to the carrier signal (e.g., a triangle waveform or sawtooth waveform), and a PWM signal is generated by setting the high (or on state) for the switches when the value of the command signal is greater than the carrier signal. Various methods of generating PWM signals are well known will not be described in detail herein.

In an exemplary embodiment, the controller 110 is configured to modulate the first set of phase legs 120, 122, 124 by generating PWM signals for the switches of phase legs 120, 122, 124 using a first carrier signal and modulate the second set of phase legs 121, 123, 125 by generating PWM signals for the switches of phase legs 121, 123, 125 using a second carrier signal. In accordance with one embodiment, the controller 110 is configured to determine or identify a modulation mode for the inverter module 106. For example, depending on the real-time operation of the electrical system 100, it may be desirable to utilize different PWM techniques, such as continuous PWM or discontinuous PWM, to reduce losses or undesirable harmonics in the electrical system 100. In an exemplary embodiment, the controller 110 determines the second carrier signal by adding a phase shift to the first carrier signal based on the identified modulation mode. In this regard, the first carrier signal and the second carrier signal may be understood as being interleaved.

Figure 3:
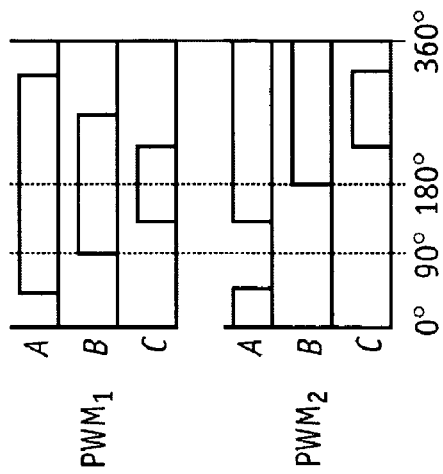
FIG. 3 is a graph of exemplary pulse-width modulation signals with respect to a switching cycle showing the effect of the phase-shifted carriers of FIG. 2 in accordance with one embodiment.
Figure 2:
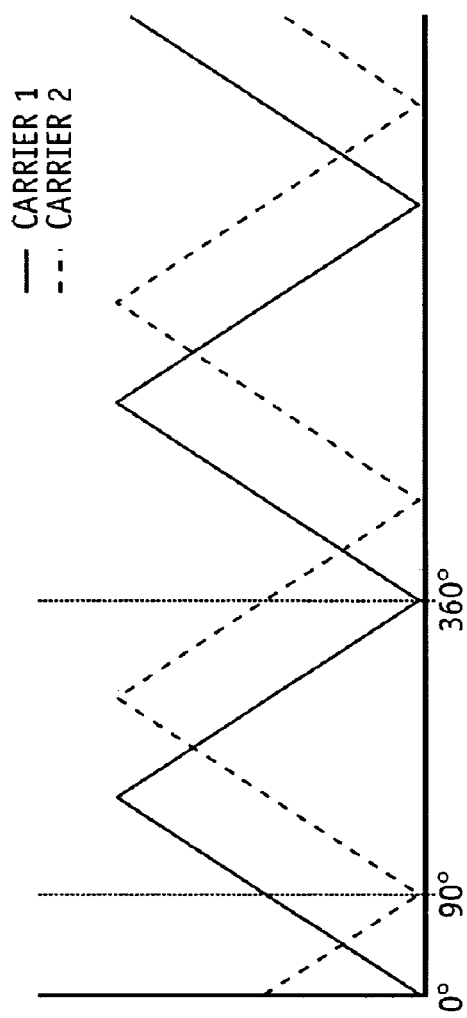
FIG. 2 is a graph of phase-shifted carrier signals suitable for use with the electrical system of FIG. 1 in accordance with one embodiment.

Referring now to FIG. 2 and FIG. 3, in an exemplary embodiment, if the modulation mode is identified as a continuous modulation mode, the controller 110 determines the second carrier signal (CARRIER 2) by adding a 90° (or π/2 radians) phase shift to the first carrier signal (CARRIER 1). As used herein, continuous modulation mode should be understood as a mode wherein each phase leg of a set of phase legs changes state for at least some portion of each switching period. It should be understood that although FIG. 2 illustrates the carrier signals as being triangle waveforms, the subject matter described herein is not limited to any particular carrier waveform. In an exemplary embodiment, the controller 110 generates a first PWM signal (PWM$_1$) for the first set of phase legs 120, 122, 124 using the first carrier signal (CARRIER 1) and a second PWM signal (PWM$_2$) for the second set of phase legs 121, 123, 125 using the second carrier signal (CARRIER 2) as shown in FIG. 3.

Referring to FIG. 3, it should be understood that a high state is intended to indicate the situation where the top switch in a respective inverter phase leg is on and a low state is intended to indicate the situation where the bottom switch in the respective inverter phase leg is on. As shown by the PWM signal for the first set of phase legs (PWM$_1$), the phase legs 120, 122, 124 are all in the same state at 0°, 180°, and 360°. This is consistent with conventional continuous PWM modulation where all inverter phase legs in a set are in the same state at the beginning (0°), middle (180°), and end (360°) of the switching period. If the PWM signal for the second set of phase legs, PWM$_2$, were generated using the same carrier as the first set of phase legs (e.g., CARRIER 1), the capacitor 112 would be effectively isolated or disconnected from the motor 108 at 0°, 180°, and 360° in the switching period. The motor currents all flow through the phase legs in the inverter 106, and therefore would produce a ripple current or inrush current when the motor currents are allowed to flow through the capacitor 112 after these points in the switching cycle. Thus, because continuous PWM modulation is symmetric to 180° (or π radians) or one half of the carrier cycle, a 90° phase shift is chosen to maximize the cancellation of ripple current caused by the motor 108 and thereby reduce the ripple current which must flow through the capacitor 112.

Figure 5:
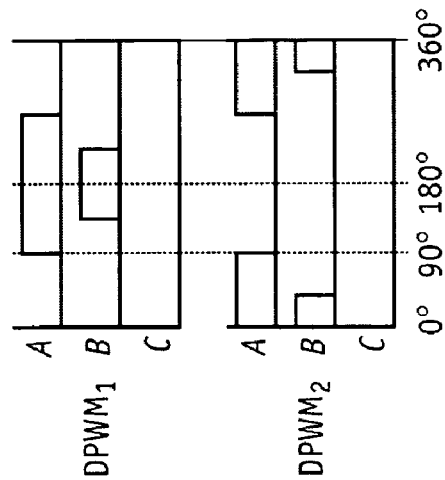
FIG. 5 is a graph of exemplary pulse-width modulation signals with respect to a switching cycle showing the effect of the phase-shifted carriers of FIG. 4 in accordance with one embodiment.
Figure 4:
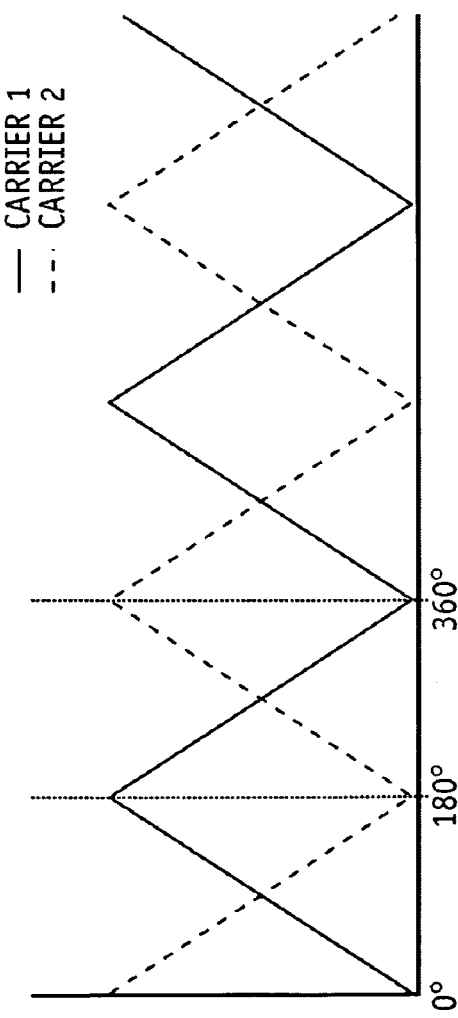
FIG. 4 is a graph of phase-shifted carrier signals suitable for use with the electrical system of FIG. 1 in accordance with one embodiment.

Referring now to FIG. 4 and FIG. 5, in an exemplary embodiment, if the modulation mode is identified as a discontinuous modulation mode, the controller 110 determines the second carrier signal by adding a 180° (or π radians) phase shift to the first carrier signal. As used herein, discontinuous modulation mode should be understood as a mode where at least one phase leg of a set of phase legs does not change state during each switching period. In an exemplary embodiment, the controller 110 generates a first DPWM signal (DPWM$_1$) for the first set of phase legs 120, 122, 124 using the first carrier signal (CARRIER 1) and a second DPWM signal (DPWM$_2$) for the second set of phase legs 121, 123, 125, using the second carrier signal (CARRIER 2) as shown in FIG. 5.

Referring to FIG. 5, it should be understood that a high state is intended to indicate the situation where the top switch in a respective inverter phase leg is on and a low state is intended to indicate the situation where the bottom switch in the respective inverter phase leg is on. As shown by the PWM signal for the first set of phase legs (DPWM$_1$), the first set phase legs 120, 122, 124 are all in the same state at 0° and 360°. This is consistent with conventional discontinuous PWM modulation where all inverter phase legs in a set are in the same state at the beginning (0°) and end (360°) of the switching period. If the PWM signal for the second set of phase legs, DPWM$_2$, were generated using the same carrier as the first set of phase legs (e.g., CARRIER 1), the capacitor 112 would be effectively isolated or disconnected from the motor 108 at 0° and 360° in the switching period. The motor currents all flow through the phase legs in the inverter 106, and would produce a ripple current or inrush current when the motor currents are allowed to flow through the capacitor 112. Thus, because discontinuous PWM modulation is symmetric to 360° (or 2π radians) or the full carrier cycle, a 180° phase shift is chosen to maximize the cancellation of ripple current caused by the motor 108 and thereby reduce the ripple current which must flow through the capacitor 112.

Still referring to FIGS. 2-5, as a result of the phase-shifted carrier signals, each phase leg 120, 121, 122, 123, 124, 125 of the inverter module 106 carries one-half of the required current for the respective phase of the motor 108. For example, the first phase A leg 120 carries one half of the commanded phase A current which flows through the first phase A winding 114 and the second phase A leg 121 carries one half of the commanded phase A current which flows through the second phase A winding 115. The effective current seen by the phase A of the motor 108 is the sum of the currents through the phase A windings 114, 115, which equals the commanded phase A current.

Figure 6:
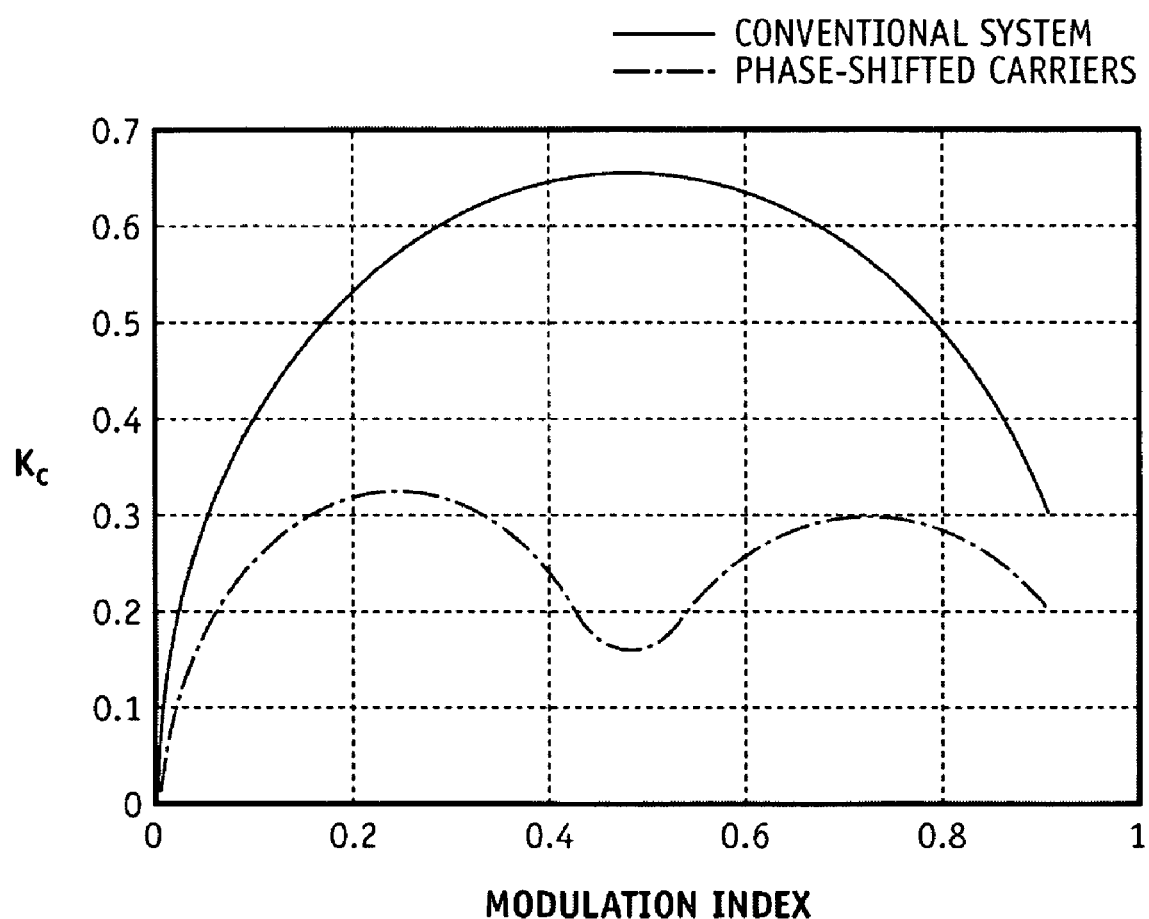
FIG. 6 is a graph of the ratio of capacitor current to output current versus modulation index for a conventional system compared to an exemplary electrical system using phase-shifted carrier signals in accordance with one embodiment.

Referring now to FIG. 6, by using phase-shifted carriers in this manner, the peak RMS ripple current seen by the capacitor 112 may be reduced by a factor of two relative to a conventional three-phase inverter system. For example, as shown in FIG. 6 for an exemplary case, the worst case or peak value of $K_C$, the ratio of capacitor current to the total output current to the motor 108, is reduced by a factor of two for the system using phase-shifted carriers when compared to a conventional system. As a result, the maximum power dissipated by the capacitor 112 is reduced by a factor of four. The frequency of the ripple current is also doubled relative to the conventional three-phase inverter system. Thus, the capacitance of the capacitor 112 may be reduced, and the volume of the capacitor 112 reduced up to a factor of four relative to conventional systems. The use of phase-shifted carriers also doubles the inverter switching frequency harmonics seen by the motor flux, which results in a more sinusoidal motor flux.

To briefly summarize, the systems and/or methods described above provide a way to reduce the peak RMS ripple current seen by the DC link capacitor and thereby reduce the volume and weight of the power inverter module. Phase-shifted carriers are used to generate PWM signals for separate three-phase groups within the motor to maximize ripple current cancellation by the inverter module. As described above, the performance of the motor is not impaired and the commanded torque may still be generated within the motor.

Other embodiments may utilize system and method described above in different types of automobiles, different vehicles (e.g., watercraft and aircraft), or in different electrical systems altogether, as it may be implemented in any situation where it is desirable to reduce the ripple current caused by a power module. Further, the motor and the inverters may have different numbers of phases, and the systems described herein should not be construed as limited to a three-phase design. The basic principles discussed herein may be extended to higher-order phase systems as will be understood in the art.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system for use in a vehicle, the electrical system comprising:
   an energy source;
   a motor having a first set of windings and a second set of windings, the first set of windings being electrically isolated from the second set of windings, and the motor including a stator having a plurality of slots, wherein:
   the first set of windings comprises a first three-phase set of windings;
   the second set of windings comprises a second three-phase set of windings; and
   the first three-phase set of windings and the second three-phase set of windings have an identical winding structure, each phase winding of the second three-phase set of windings occupying slots of the plurality of slots that are occupied by its corresponding phase winding of the first three-phase set of windings;
   an inverter module coupled between the energy source and the motor, the inverter module comprising:
   a first set of phase legs coupled to the first set of windings; and
   a second set of phase legs coupled to the second set of windings; and
   a controller coupled to the inverter module, the controller being configured to achieve a desired power flow between the energy source and the motor by:
   modulating the first set of phase legs using a first carrier signal; and
   modulating the second set of phase legs using the second carrier signal, the second carrier signal being phase-shifted relative to the first carrier signal.

2. The electrical system of claim 1, further comprising a capacitor coupled to the inverter module and the energy source, wherein the capacitor is electrically parallel to the energy source.

3. The electrical system of claim 1, wherein the controller is configured to:
   identify a modulation mode for the inverter module; and
   determine the second carrier signal by adding a phase shift to the first carrier signal, wherein the phase shift is based on the modulation mode.

4. The electrical system of claim 3, wherein if the modulation mode is a continuous modulation mode, the controller is configured to determine the second carrier signal by adding a 90° phase shift to the first carrier signal.

5. The electrical system of claim 3, wherein if the modulation mode is a discontinuous modulation mode, the controller is configured to determine the second carrier signal by adding a 180° phase shift to the first carrier signal.

6. The electrical system of claim 1, wherein:
the first set of phase legs comprises three phase legs, each being connected to a respective phase of the first three-phase set of windings; and
the second set of phase legs comprises three phase legs, each being connected to a respective phase of the second three-phase set of windings.

7. The electrical system of claim 1, wherein each phase winding of the second three-phase set of windings has a winding factor corresponding to a winding factor of its corresponding phase winding of the first three-phase set of windings.

8. An automotive drive system comprising:
an energy source;
an electric motor comprising a first winding and a second winding, the first winding and the second winding being electrically isolated, wherein the first winding and the second winding each correspond to a first phase of the electric motor;
an inverter module coupled to the energy source, the inverter module comprising:
a first phase leg coupled to the first winding; and
a second phase leg coupled to the second winding; and
a controller coupled to the inverter module, the controller being configured to:
modulate the first phase leg using a first carrier;
identify a modulation mode for the inverter module;
determine a second carrier based on the modulation mode, the second carrier being phase-shifted relative to the first carrier; and
modulate the second phase leg using the second carrier.

9. The automotive drive system of claim 8, wherein the first winding and the second winding have the same winding structure.

10. The automotive drive system of claim 9, wherein the first winding and the second winding have the same winding factor and occupy the same slots in a stator of the electric motor.

11. The automotive drive system of claim 8, wherein if the modulation mode is a continuous modulation mode, the controller determines the second carrier by adding a 90° phase shift to the first carrier.

12. The automotive drive system of claim 8, wherein if the modulation mode is a discontinuous modulation mode, the controller determines the second carrier by adding a 180° phase shift to the first carrier.

13. The automotive drive system of claim 8, wherein:
the electric motor further comprises a third winding and a fourth winding, the third winding and the fourth winding being electrically isolated;
the third winding and the fourth winding each correspond to a second phase of the electric motor;
the inverter module further comprises:
a third phase leg coupled to the third winding; and
a fourth phase leg coupled to the fourth winding; and
the controller is configured to:
modulate the third phase leg using the first carrier; and
modulate the fourth phase leg using the second carrier.

14. The automotive drive system of claim 13, wherein:
the electric motor further comprises a fifth winding and a sixth winding, the fifth winding and the sixth winding being electrically isolated;
the fifth winding and the sixth winding each correspond to a third phase of the electric motor;
the inverter module further comprises:
a fifth phase leg coupled to the fifth winding; and
a sixth phase leg coupled to the sixth winding; and
the controller is configured to:
modulate the fifth phase leg using the first carrier; and
modulate the sixth phase leg using the second carrier.

15. The automotive drive system of claim 8, further comprising a capacitor coupled to the inverter module and the energy source, wherein the capacitor is electrically parallel to the energy source.

16. The automotive drive system of claim 8, wherein the energy source is selected from the group consisting of a battery, a fuel cell, an ultracapacitor, a generator output.

17. A method for operating an inverter module for an electric motor, the electric motor having a first set of windings coupled to a first set of phase legs of the inverter module and a second set of windings coupled to a second set of phase legs of the inverter module, the method comprising:
modulating the first set of phase legs using a first carrier signal;
identifying a modulation mode for the inverter module;
determining a second carrier signal based on the modulation mode, the second carrier signal having a phase shift relative to the first carrier signal; and
modulating the second set of phase legs using the second carrier signal.

18. The method of claim 17, wherein determining the second carrier signal comprises adding a 90° phase shift to the first carrier signal if the modulation mode is a continuous modulation mode.

19. The method of claim 17, wherein determining the second carrier signal comprises adding a 180° phase shift to the first carrier signal if the modulation mode is a discontinuous modulation mode.

20. An electrical system for use in a vehicle, the electrical system comprising:
an energy source;
a motor having a first set of windings and a second set of windings, the first set of windings being electrically isolated from the second set of windings;
an inverter module coupled between the energy source and the motor, the inverter module comprising:
a first set of phase legs coupled to the first set of windings; and
a second set of phase legs coupled to the second set of windings; and
a controller coupled to the inverter module, the controller being configured to achieve a desired power flow between the energy source and the motor by:
modulating the first set of phase legs using a first carrier signal;
identifying a modulation mode for the inverter module;
determining a second carrier signal by adding a phase shift to the first carrier signal, wherein the phase shift is based on the modulation mode; and
modulating the second set of phase legs using the second carrier signal.

* * * * *